US 6,737,094 B2

(12) United States Patent
Bernitt et al.

(10) Patent No.: US 6,737,094 B2
(45) Date of Patent: May 18, 2004

(54) LOW-STAINING ORANGE FOOD COLORING COMPOSITION

(75) Inventors: Jennifer Bernitt, Flushing, NY (US); Byron Madkins, Milwaukee, WI (US); Joey Rudnicki, Greenfield, WI (US)

(73) Assignee: PepsiCo, Inc., Purchase, NY (US)

( * ) Notice: Subject to any disclaimer, the term of this patent is extended or adjusted under 35 U.S.C. 154(b) by 68 days.

(21) Appl. No.: 09/870,806

(22) Filed: May 31, 2001

(65) Prior Publication Data

US 2002/0122851 A1 Sep. 5, 2002

Related U.S. Application Data

(60) Provisional application No. 60/208,172, filed on May 31, 2000.

(51) Int. Cl.$^7$ .............................. A23L 1/27; A23L 2/38
(52) U.S. Cl. ....................... 426/250; 426/540; 426/590; 426/477
(58) Field of Search ................ 426/540, 590, 426/250, 477

(56) References Cited

U.S. PATENT DOCUMENTS

| | | | | |
|---|---|---|---|---|
| 3,511,667 A | * | 5/1970 | Schramm et al. ............ 426/250 |
| 3,939,283 A | * | 2/1976 | Billington ................... 426/250 |
| 4,082,682 A | | 4/1978 | Inamorato et al. ............ 252/92 |
| 4,323,587 A | * | 4/1982 | Basa et al. .................. 426/540 |
| 4,592,940 A | | 6/1986 | Blyth et al. ................... 428/96 |
| 4,623,539 A | | 11/1986 | Tunc .......................... 424/79 |
| 4,664,925 A | | 5/1987 | McShane ..................... 426/250 |
| 4,678,475 A | | 7/1987 | Hoshowski et al. ............ 8/606 |
| 4,822,499 A | | 4/1989 | Wahl et al. ................... 252/8.8 |
| 4,865,885 A | | 9/1989 | Herlant et al. ............... 427/322 |
| 5,009,940 A | | 4/1991 | McShane ..................... 428/35.7 |
| 5,096,726 A | | 3/1992 | Keown et al. ............... 426/250 |
| 5,227,189 A | | 7/1993 | Vassiliou .................... 426/614 |
| 5,246,725 A | | 9/1993 | Fisher et al. ................. 426/565 |
| 5,292,544 A | | 3/1994 | Coutant et al. .............. 426/573 |
| 5,478,582 A | | 12/1995 | Smith et al. ................. 426/250 |
| 5,558,880 A | | 9/1996 | Gole et al. ................... 424/484 |
| 5,571,551 A | | 11/1996 | Fusi et al. ................... 426/540 |
| 5,621,005 A | | 4/1997 | Gowan, Jr. .................. 514/557 |
| 5,639,500 A | | 6/1997 | Fusi et al. ................... 426/540 |
| 5,681,604 A | | 10/1997 | Li et al. ..................... 426/540 |
| 5,712,310 A | | 1/1998 | Koch .......................... 514/570 |
| 5,746,778 A | | 5/1998 | Jankewitz et al. ............. 8/402 |
| 5,762,992 A | | 6/1998 | Takeuchi et al. ............ 426/548 |
| 5,779,805 A | | 7/1998 | Morano ....................... 127/42 |
| 5,780,086 A | * | 7/1998 | Kirksey et al. ............... 426/546 |
| 5,882,707 A | * | 3/1999 | Grillo et al. ................. 426/302 |
| 5,993,880 A | | 11/1999 | Frost et al. .................. 426/540 |

FOREIGN PATENT DOCUMENTS

| | | |
|---|---|---|
| EP | 0 626 139 | 11/1994 |
| GB | 1 313 079 | 4/1973 |

OTHER PUBLICATIONS

Chem. Abstracts, vol. 112, No. 15, abstract No. 137647 (1990).
D.E. Pszczola, "Natural Colors: Pigments of Imagination", Food Tech., vol. 52, No. 6, pp. 70–76 (1998).
D. Frick et al., "Food Color Terminology", Cereal Foods World, vol. 40, No. 4, pp. 209–218 (1995).
All About Lake Pigments, Warner–Jenkinson Co., Inc., brochure (1995).
Certified Food Colors, Warner–Jenkinson Co., Inc., brochure, 1998.

* cited by examiner

*Primary Examiner*—N. Bhat
(74) *Attorney, Agent, or Firm*—Fitzpatrick, Cella, Harper & Scinto

(57) ABSTRACT

A low-staining orange food coloring composition and a process of producing such a food coloring is disclosed, as well as an orange colored beverage composition colored with such a food coloring composition and a process of producing such a beverage. The orange food coloring composition comprises a combination of a yellow dye selected from the group consisting of FD&C Yellow #5, quinoline yellow and combinations thereof and a red dye selected from the group consisting of carmoisine, Ponceau 4R, FD&C Red #40, amaranth and combinations thereof.

18 Claims, No Drawings

LOW-STAINING ORANGE FOOD COLORING COMPOSITION

This application claims the benefit of U.S. Provisional Patent Application No. 60/208,172, filed May 31, 2000.

FIELD OF THE INVENTION

The present invention relates to a low-staining orange food coloring composition and a process of producing such a food coloring. The present invention also relates to an orange colored beverage composition colored with such a food coloring composition and a process of producing such a beverage. In particular, the present invention relates to a combination of a yellow dye and a red dye, which results in a low-staining orange coloring composition suitable for use in foods and beverages.

BACKGROUND OF THE INVENTION

In the food and beverage industry, FD&C Yellow #6, despite its name, is typically used to achieve a bright orange hue. Due to the nature of and the usage level required to achieve such an intense orange color with FD&C Yellow #6, staining of the lips, teeth and tongue often occurs upon consumption of foods and beverages colored with FD&C Yellow #6.

In fact, quite often consumers voice concern and dissatisfaction with the lip, tongue, and teeth staining caused by FD&C Yellow #6. It is believed that many consumers of orange-colored food and beverage products become so dissatisfied with the staining, that they discontinue use of the product. Further, staining of models during photo shoots and filming of advertisements and commercials for orange-colored foods and beverages raises the cost of marketing such foods and beverages.

While consumers continue to voice dissatisfaction with the staining associated with the intense orange color of FD&C Yellow #6 in foods and beverages, the intensity of the orange color remains one of the most important factors, second only to taste, with respect to orange-flavored beverages. Clearly color is essential in supporting the expectation of the flavor and flavoring components, especially in orange-flavored beverages. In fact, some beverages are colored with a combination of FD&C Yellow #6 and a red dye in order to achieve an even more intense orange color; these beverages exhibit the same problems associated with staining.

A less-staining orange food coloring composition is very desirable and has been sought after for quite some time. Currently, however, methods of stain reduction when using artificial colors are quite limited. One option is to reduce the color use level of known orange colorants. However, this results in a decrease in the intensity of the shade of color. This option is not viable in view of the importance of color intensity to the consumer as mentioned above.

Another option is to include certain stain-inhibiting agents or to employ certain stain-inhibiting methods in the production of food coloring compositions. U.S. Pat. Nos. 5,993,880, 5,681,604, 5,639,500 and 5,571,551 relate to treatment with or inclusion of copper chlorophyllin, plant extracts or gallotannins in the food or beverage compositions. Due to cost, simplicity, taste and even safety concerns, it may not be desirable to include additional ingredients in orange-colored food and beverage products to achieve less staining.

Attempts have also been made to prevent staining in carpets and upholstery through the use of specially formulated dyes. To that end, U.S. Pat. Nos. 5,096,726, 4,865,885 and 4,592,940 relate to the use of sulfonated naphthol-formaldehyde or phenol-formaldehyde.

Further attempts have been made with respect to producing non-staining fabric detergents and conditioners. U.S. Pat. No. 4,822,499 relates to a liquid fabric softener with a stable non-staining pink color comprising specific light-stable dyes at levels which provide a pink color in a pH of less than 7.

U.S. Pat. No. 4,678,475 relates to a violet-colored dye-conditioner composition that is non-staining to skin; addition of a dialkyl quaternary ammonium compound is required. U.S. Pat. No. 4,082,682 relates to a detergent composition containing distinctive, colored, non-staining soap particles.

Blends of colors have not heretofore been used to reduce the staining effects of known colors. Blends of colors, including blends of yellows and reds alone or with other colors, have been used as coloring agents in a variety of contexts (U.S. Pat. Nos. 5,246,725, 5,780,086, 5,779,805, 5,762,992, 5,227,189, 5,882,707 and 5,292,544 in foods; U.S. Pat. Nos. 5,558,880, 5,621,005, 5,712,310 and 4,623,539 in pharmaceuticals; and U.S. Pat. No. 5,746,778 in a wood stain). Such blends of colors may achieve a variety of purposes, including masking browning in tea beverages (U.S. Pat. No. 5,780,086) and dyeing eggs (U.S. Pat. Nos. 5,009,940 and 4,664,925).

Hence, it is clear that a less-staining orange food coloring composition which does not require the addition of stain-inhibiting agents and which achieves an intense orange color is highly desirable.

SUMMARY OF THE INVENTION

The present invention is directed to a low-staining orange food coloring composition comprising a combination of a yellow dye selected from the group consisting of FD&C Yellow #5, quinoline yellow and combinations thereof and a red dye selected from the group consisting of carmoisine, Ponceau 4R, FD&C Red #40, amaranth and combinations thereof, wherein the yellow dye and the red dye are present in a ratio of from about 4:1 to about 2:1.

The present invention is further directed to a process for producing a low-staining orange food coloring composition by combining a yellow dye selected from the group consisting of FD&C Yellow #5, quinoline yellow and combinations thereof and a red dye selected from the group consisting of carmoisine, Ponceau 4R, FD&C Red #40, amaranth and combinations thereof, wherein the yellow dye and the red dye are present in a ratio of from about 4:1 to about 2:1.

Other embodiments of the present invention are directed to an orange colored beverage composition which has, as the sole source of color, a combination of a yellow dye selected from the group consisting of FD&C Yellow #5, quinoline yellow and combinations thereof and a red dye selected from the group consisting of carmoisine, Ponceau 4R, FD&C Red #40, amaranth and combinations thereof, wherein the yellow dye and the red dye are present in a ratio of from about 4:1 to about 2:1. A process for making such orange colored beverage compositions is also included in the present invention.

DETAILED DESCRIPTION

The present invention is directed to a low-staining orange food coloring composition and a process of producing such a food coloring. The present invention is further directed to an orange colored beverage composition colored with such a food coloring composition and a processes of producing such a beverage.

The orange food coloring composition of the present invention comprises a combination of a yellow dye selected from the group consisting of FD&C Yellow #5, quinoline yellow and combinations thereof and a red dye selected from the group consisting of carmoisine, Ponceau 4R, FD&C Red #40, amaranth and combinations thereof.

By using an approximate ratio of 3:1 of yellow to red, the present inventive orange food coloring composition at 10 ppm can achieve the same intensity as a 45.5 ppm solution of FD&C Yellow #6, while exhibiting significantly less staining of the mouth, tongue, teeth and skin. Thus, the use level of the present inventive low-staining orange food coloring composition is more than five-fold lower than FD&C Yellow #6, while the cost per pound of the present inventive coloring is not significantly higher than the cost per pound of FD&C Yellow #6, resulting in a significant cost savings.

According to the present invention, the yellow dye suitable for combination with a red dye is FD&C Yellow #5, quinoline yellow or a combination thereof. Each of these dyes is commercially available and well known in the food coloring industry.

FD&C Yellow #5 or 5-oxo-1-(p-sulfophenyl)-4-[(p-sulfophenyl)azo]-2-pyrazoline-3-carboxylic acid trisodium salt has the following structure:

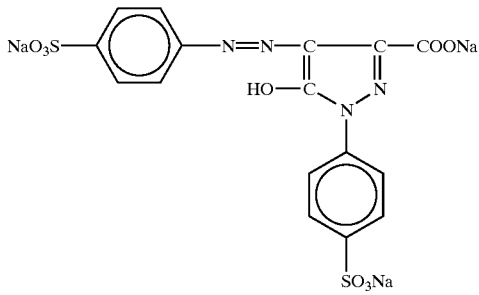

FD&C Yellow #5 is also known as tartrazine, E102 and CI Food Yellow 4 and can be identified as CI #19140 or CAS #1934-21-0. FD&C Yellow #5 is a bright yellow, water-soluble synthetic azo dye. It exhibits good heat and light stability. Recent toxicology studies conducted in the US show that FD&C Yellow #5 is one of the safest food additives known. The use of FD&C Yellow #5 is generally permitted around the world.

Quinoline yellow or disodium salts of the disulfonates of 2-(2-quinolyl)indan-1,3-dione has the following structure:

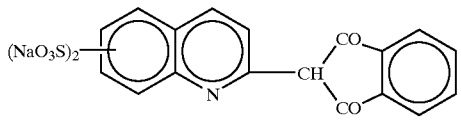

This colorant is primarily a mixture of mono- and disulfonated forms. Quinoline yellow is also known as E104 and CI Food Yellow 13 and can be identified as CI #47005 or CAS #8004-72-0. It is a bright greenish yellow, water-soluble synthetic quinoline dye. Quinoline yellow exhibits excellent heat and light stability. Currently, in the US, quinoline yellow is permitted for drug and cosmetic use only.

According to the present invention, the red dye suitable for combination with the yellow dye is carmoisine, Ponceau 4R, FD&C Red #40, amaranth or any combination thereof.

Carmoisine or disodium 4-hydroxy-3-(4-sulfonato-1-naphthylazo)naphthalene-1-sulfonate has the following structure:

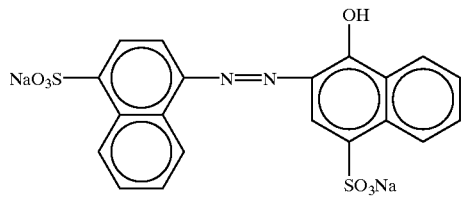

Carmoisine is also known as azorubine, E122 and CI Food Red 3 and can be identified as CI #14720 or CAS #3567-69-9. It is a magenta red, water-soluble synthetic azo dye, which is susceptible to degradation from reducing and oxidizing agents. Carmoisine is slightly less heat-stable than amaranth and exhibits fair light stability. The shade produced by this dye is virtually indistinguishable from amaranth. Carmoisine is currently approved for use in many international markets.

Ponceau 4R or trisodium-2-hydroxy-1-(4-sulfonato-1-naphthylazo)naphthalene-6,8-disulfonate has the following structure:

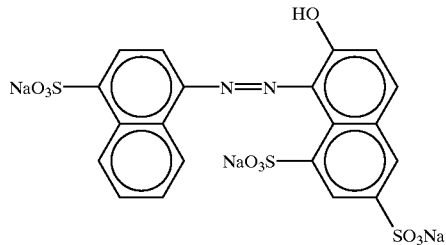

Ponceau 4R is also known as cochineal Red A, New coccine, E124 and CI Food Red 7 and can be identified as CI #16255 or CAS #2611-82-7. It is a yellowish red, water-soluble synthetic azo dye. Ponceau 4R exhibits moderate heat and light stability and is very similar in shade to allura red. Currently, Ponceau 4R is not permitted to be used as a dye in the US but is widely used around the world.

FD&C Red #40 or disodium salt of 6-hydroxy-5[(2-methyl-4-sulfophenyl)azo]-2-naphthalenesulfonic acid has the following structure:

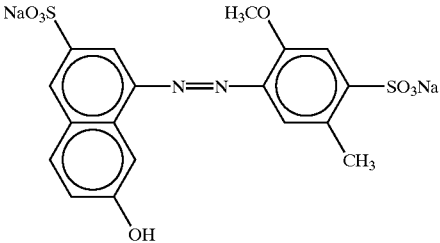

FD&C Red #40 is also known as allura red, E129 and CI Food Red 17 and can be identified as CI #16035 or CAS #25956-17-6. FD&C Red #40 is an orangish red, water-soluble, synthetic azo dye. It is very susceptible to degradation from reducing and oxidizing agents and not stable to retort conditions. FD&C Red #40 exhibits fair light stability. It is gaining world-wide approval and is currently permitted to be used as a dye in Europe, Japan, Canada, and the US.

Amaranth or trisodium 2-hydroxy-1-(4-sulfonato-1-naphthylazo)naphthalene-3,6-disulfonate has the following structure:

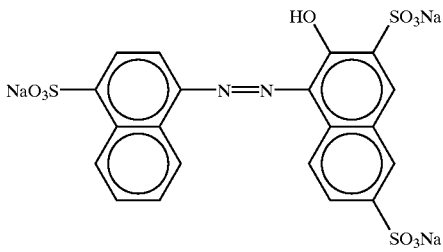

Amaranth is also known as E123 or CI Food Red 9 and can be identified as CI #16185 or CAS #915-67-3. Amaranth is a magenta red, water-soluble, synthetic azo dye. It is susceptible to degradation from reducing and oxidizing agents and not stable to retort conditions. Amaranth exhibits fair light stability. It is one of the most commonly used synthetic dyes around the world.

According to the present invention, the yellow dye and the red dye are present in a ratio of from about 4:1 yellow:red to about 2:1 yellow:red, preferably about 3:1 yellow:red. When dissolved in a 10 ppm solution, the present inventive orange food coloring composition delivers the equivalent orange shade as a 45.5 ppm solution of FD&C Yellow #6.

The combination of yellow dye and red dye of the present invention is prepared according to any known color manufacturing technique. Typically, the combination of yellow dye and red dye of the present invention is prepared by blending the yellow dye and the red dye together and granulating the blend.

The orange food coloring composition of the present invention may be in a powder or granular form. As used in the art, food coloring compositions typically have an 86–91% purity level.

Another embodiment of the present invention is directed to an orange colored beverage composition comprising as the source of color the present inventive orange food coloring composition.

Beverages include, without limitation, carbonated soft drinks, fountain beverages, frozen ready-to-drink beverages, powdered soft drinks, as well as liquid concentrates, flavored waters, fruit juice and fruit juice flavored drinks, sport drinks and alcoholic products. The beverage may be carbonated or noncarbonated. In a preferred embodiment of the present invention, the beverage is a carbonated orange-flavored soft drink.

Generally the combination of the yellow dye and the red dye is present in an orange-colored beverage in an amount ranging from about 7 ppm to about 40 ppm, preferably from about 10 ppm to about 30 ppm and most preferably about 27 ppm.

It is possible to use the present orange food coloring composition to provide color in other food products. Such food products include, without limitation, confections, dairy products, gelatins, cake mixes, baked goods and salty snacks such as corn or potato chips. One of ordinary skill in the art would appreciate that the amount of colorant required varies with each application and would readily be able to determine a suitable amount based on the present disclosure.

An additional embodiment of the present invention is directed to a process of producing a low staining orange food coloring composition by combining the yellow dye and the red dye as above described. A still further embodiment is directed to a process for producing an orange colored beverage composition comprising adding to the beverage composition a low-staining orange food coloring composition of the present invention.

The Examples which follow are intended as an illustration of certain preferred embodiments of the invention, and no limitation of the invention is implied.

EXAMPLE 1

An orange-flavored carbonated beverage was prepared by combining water, carbonated water, sugar, citric acid (for tartness), orange flavor, sodium benzoate (preservative), ascorbic acid (anti-oxidant) and 25.0 ppm of a 3:1 combination of FD&C Yellow #5 and FD&C Red #40. A beverage was achieved having a Brix of 12.9, a titratable acidity of 26.6 and a carbonation of 2.1 volumes.

Comparative Testing I

Monadic taste evaluations as well as two visual staining evaluations, including mouth/tongue and finger tests, were conducted to determine the amount of staining resulting from the use of the invention.

Respondents provided sequential monadic taste evaluations, as well as visual mouth and finger staining evaluations, for the following three carbonated orange-flavored drink products:

X. current Chinese Mirinda formula (PepsiCo, Valhalla, N.Y.)

Y. Chinese Mirinda formula using the inventive low-staining orange food coloring composition (PepsiCo, Valhalla, N.Y.)

Z. Chinese Fanta (Coca-Cola Co., Atlanta, Ga.).

Testing was balanced completely by product order, location (50% Beijing, China and 50% Shanghai, China), gender (50% male and 50% female) and age (20% each of 12–15, 16–19, 20–24, 25–29, and 30–39). A total of 600 respondents participated.

1. Monadic Taste Evaluation

Six ounces of a chilled sample of each of Samples X–Z were poured for monadic evaluations. Respondents were asked to drink at least ½ before making an evaluation. All three samples were tested sequentially with appropriate palate cleansing between samples. Samples were evaluated using the criteria listed in Table 1 below. Results are listed in Table 1.

TABLE 1

Monadic Taste Evaluation Results.

|  | X | Y | Z |
|---|---|---|---|
| overall acceptability means purchase intent: | 6.50 | 6.42 | 6.38 |
| top box %** | 24% | 28% | 28% |
| top 2 box %** | 70% | 72% | 69% |
| orange flavor pleasantness mean amount of orange flavor: | 3.61 | 3.63 | 3.54 |
| % too little | 16% b | 16% b | 21% a |
| % just right | 51% a | 54% a | 45% b |
| % too much amount of sweetness: | 33% | 30% | 34% |
| % too little | 8% | 11% | 11% |
| % just right | 54% a | 54% a | 62% b |
| % too much | 37% b | 35% b | 27% a |

TABLE 1-continued

Monadic Taste Evaluation Results.

|  | X | Y | Z |
|---|---|---|---|
| aftertaste pleasantness mean | 3.40 | 3.43 | 3.42 |
| orange color pleasantness mean | 3.62 | 3.61 | 3.59 |

*percentages/means with different lower case letters ("a", "b") are statistically different at 95% confidence **top box % and top 2 box % refer to the percentage of respondents scoring the sample as a 5 (top box) or as a 5 or a 4 (top 2 box) on a scale from 1–5 as follows: 5 = definetly would buy; 4 = probably would buy; 3 = may or may not buy; 2 = probably would not buy; and 1 = definitely would not buy Sample Y, the current Mirinda beverage formula but incorporating the inventive low-staining orange food coloring composition received similar scores for all monadic attributes as compared to Samples X and Z. Sample Y also received similar mean scores to current Mirinda for orange color pleasantness, indicating that respondents found these samples equally visually acceptable.

Sample Z (Fanta) was significantly different from both Samples X and Y. Sample Z had less orange flavor, as evidenced by its higher "% too little" and lower "% just right" scores. Sample Z also exhibited less sweetness, as evidenced by its lower "% too much" and higher "% just right".

2. Mouth Staining Test

After respondents completed the monadic evaluation of a first sample, they were given the same sample and asked to gargle 1–2 ounces of the sample in their mouth for 45 seconds. Upon expectoration of the sample, respondents evaluated their mouth/tongue in a mirror and scored the residual color using the 1 to 5 point color intensity scale described below:

5=extreme amount of orange stain
4=large amount of orange stain
3=moderate amount of orange stain
2=slight amount of orange stain
1=no orange stain present.

The order of Samples X–Z were rotated in the monadic evaluation so as to allow for mouth staining evaluation of each of the samples by one third of the respondents and so that each respondent evaluated only one sample in terms of mouth staining.

TABLE 2

Mouth Staining Test Results.

| sample | average score |
|---|---|
| X | 3.17c |
| Y | 2.43a |
| Z | 2.95b |

*scores with different lower case letters ("a", "b", "C") are statistically different at 95% confidence Sample Y, the current Mirinda formula using the inventive low-staining orange food coloring composition, received significantly (p<0.001) lower mouth staining scores than both Samples X and Z.

3. Finger Staining Test

After the completion of monadic evaluations for each of Samples X–Z, respondents completed a finger test in which they swirled one finger from each hand in two separate samples for 45 seconds. Sample Y was directly compared to either Sample X or Sample Z. Respondents were then asked which sample stained their fingers more.

Only 1% of respondents felt that their fingers were equally stained by Sample Y and Sample X. Ninety-eight percent said that Sample X stained more. Only 3% of respondents felt that their fingers were equally stained by Sample Y and Sample Z. Ninety-six percent said that Sample Z stained more.

4. Overall Preference

Respondents were asked for their most preferred and least preferred of Samples X–Z. Results are shown in Table 3.

TABLE 3

Overall Preference Results.

|  | preferred most | preferred least |
|---|---|---|
| X | 32% b | 29% b |
| Y | 39% a | 28% b |
| Z | 29% b | 42% a |

*percentages with different lower case letters ("a", "b") are statistically different at 95% confidence Sample Y, the current Mirinda beverage formula but incorporating the inventive low-staining orange food coloring composition, was significantly most preferred over Samples X and Z. Sample Z was significantly least preferred when compared to both Samples X and Y. Since all three samples were parity based on taste (see Table 1 Monadic Taste Evaluation Results (overall acceptability means), it can be inferred that after seeing the benefits of a less staining orange beverage in the staining test, respondents significantly preferred Sample Y because of its less staining characteristics.

Comparative Testing II

Visual finger staining evaluations were conducted in Saudi Arabia and Mexico to determine the amount of staining resulting from the use of the present invention. Respondents directly compared Sample P, the Saudi Arabian or Mexican Fanta (Coca-Cola Co., Atlanta, Ga.), with either control Sample Q, the current Saudi Arabian Mirinda formula (PepsiCo, Valhalla, N.Y.), or one of Samples R–W, variations of the current Saudi Arabian or Mexican Mirinda formula using the inventive low-staining orange food coloring composition (PepsiCo, Valhalla, N.Y.).

In particular, respondents swirled one finger from each hand in two separate samples, i.e., Sample P and one of Samples Q–W, for 45 seconds. Respondents were then asked which sample stained their fingers more. Results are listed in Tables 4 and 5.

TABLE 4

Finger Staining Results in Saudi Arabia.

| sample | % responding sample stained more than Sample P | % responding Sample P stained more | % responding equally staining as Sample P |
|---|---|---|---|
| Q | 13.3 | 71.0 | 15.7 |
| R | 7.3 | 79.3 | 13.3 |
| S | 4.3 | 82.3 | 13.3 |
| T | 4.0 | 81.0 | 15.0 |
| U | 3.7 | 80.3 | 16.0 |
| V | 5.3 | 77.7 | 17.0 |
| W | 3.7 | 78.0 | 18.3 |

TABLE 5

Finger Staining Results in Mexico.

| sample | % responding sample stained more than Sample P | % responding Sample P stained more | % responding equally staining as Sample P |
|---|---|---|---|
| Q | 67.2 | 26.2 | 6.6 |
| R | 17.8 | 78.6 | 3.6 |
| S | 21.0 | 73.0 | 6.0 |
| T | 13.4 | 82.3 | 4.3 |
| U | 19.6 | 75.1 | 5.0 |
| V | 22.0 | 74.7 | 3.3 |
| W | 18.5 | 77.2 | 4.3 |

It is clear from the results listed in Tables 4 and 5 that Samples R–W were viewed as significantly less staining than Samples Q and P. The results are particularly significant in view of the fact that all of Samples R–W had a noticeably more intense orange color than Sample P.

While the invention has been described in terms of preferred embodiments and specific examples, those skilled in the art will recognize through routine experimentation that various changes and modifications can be made without departing from the spirit and scope of the invention. Thus, the invention should be understood as not being limited by the foregoing detailed description, but as being defined by the appended claims and their equivalents.

What is claimed is:

1. A low-staining orange food coloring composition comprising a combination of a yellow dye selected from the group consisting of FD&C Yellow #5, quinoline yellow and combinations thereof, and a red dye selected from the group consisting of carmoisine, Ponceau 4R, FD&C Red #40, amaranth and combinations thereof, wherein the yellow dye and the red dye are present in a ratio of from about 4:1 yellow:red to about 2:1 yellow:red.

2. The low-staining orange food coloring composition according to claim 1, wherein the yellow dye and the red dye are present in a ratio of about 3:1 yellow:red.

3. A low-staining orange food coloring composition consisting essentially of a combination of a yellow dye selected from the group consisting of FD&C Yellow #5, quinoline yellow and combinations thereof and a red dye selected from the group consisting of carmoisine, Ponceau 4R, FD&C Red #40, amaranth and combinations thereof, wherein the yellow dye and the red dye are present in a ratio of from about 4:1 yellow:red to about 2:1 yellow:red.

4. The low-staining orange food coloring composition according to claim 3, wherein the yellow dye and the red dye are present in a ratio of about 3:1 yellow:red.

5. A low-staining orange food coloring composition consisting of a combination of a yellow dye selected from the group consisting of FD&C Yellow #5, quinoline yellow and combinations thereof and a red dye selected from the group consisting of carmoisine, Ponceau 4R, FD&C Red #40, amaranth and combinations thereof, wherein the yellow dye and the red dye are present in a ratio of from about 4:1 yellow:red to about 2:1 yellow:red.

6. The low-staining orange food coloring composition according to claim 5, wherein the yellow dye and the red dye are present in a ratio of about 3:1 yellow:red.

7. A process for producing a low-staining orange food coloring composition which comprises combining a yellow dye selected from the group consisting of FD&C Yellow #5, quinoline yellow and combinations thereof and a red dye selected from the group consisting of carmoisine, Ponceau 4R, FD&C Red #40, amaranth and combinations thereof, wherein the yellow dye and the red dye are combined in a ratio of from about 4:1 yellow:red to about 2:1 yellow:red.

8. The process for producing a low-staining orange food coloring composition according to claim 7, wherein the yellow dye and the red dye are combined in a ratio of about 3:1 yellow:red.

9. An orange colored beverage composition comprising as the sole source of color a combination of a yellow dye selected from the group consisting of FD&C Yellow #5, quinoline yellow and combinations thereof and a red dye selected from the group consisting of carmoisine, Ponceau 4R, FD&C Red #40, amaranth and combinations thereof, wherein the yellow dye and the red dye are present in a ratio of from about 4:1 yellow:red to about 2:1 yellow:red.

10. The orange colored beverage composition according to claim 9, wherein the yellow dye and the red dye are present in a ratio of about 3:1 yellow:red.

11. The orange colored beverage composition according to claim 9, wherein the combination of the yellow dye and the red dye are present in the orange colored beverage composition in an amount of from about 7 ppm to about 40 ppm.

12. The orange colored beverage composition according to claim 9, wherein the combination of the yellow dye and the red dye are present in the orange colored beverage composition in an amount of from about 10 ppm to about 30 ppm.

13. The orange colored beverage composition according to claim 12, wherein the combination of the yellow dye and the red dye are present in the orange colored beverage composition in an amount of about 27 ppm.

14. A process of producing a low-staining orange colored beverage composition which comprises adding to a beverage a combination of a yellow dye selected from the group consisting of FD&C Yellow #5, quinoline yellow and combinations thereof and a red dye selected from the group consisting of carmoisine, Ponceau 4R, FD&C Red #40, amaranth and combinations thereof, wherein the yellow dye and the red dye are present in a ratio of from about 4:1 yellow:red to about 2:1 yellow:red.

15. A process of producing a low-staining orange colored beverage composition according to claim 14, wherein the yellow dye and the red dye are present in a ratio of about 3:1 yellow:red.

16. A process of producing a low-staining orange colored beverage composition according to claim 14, wherein the combination of the yellow dye and the red dye are present in the orange colored beverage composition in an amount of from about 7 ppm to about 40 ppm.

17. A process of producing a low-staining orange colored beverage composition according to claim 16, wherein the combination of the yellow dye and the red dye are present in the orange colored beverage composition in an amount of from about 10 ppm to about 30 ppm.

18. A process of producing a low-staining orange colored beverage composition according to claim 17, wherein the combination of the yellow dye and the red dye are present in the orange colored beverage composition in an amount of about 27 ppm.

* * * * *